US012810294B2

(12) United States Patent
Kanwar et al.

(10) Patent No.: US 12,810,294 B2
(45) Date of Patent: Nov. 24, 2026

(54) METHOD AND SYSTEM TO IMPROVE STAND-IN TRANSACTIONS APPROVAL THROUGH BLOCKCHAIN INTEROPERABILITY AND SMART CONTRACTS

(71) Applicant: MASTERCARD INTERNATIONAL INCORPORATED, Purchase, NY (US)

(72) Inventors: Ravi Kanwar, Bahadurgarh (IN); Jiajia Wang, Scarborough (CA); Vishnupriya Satheesh, Halifax (CA)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 19/044,969

(22) Filed: Feb. 4, 2025

(65) Prior Publication Data

US 2026/0228728 A1 Aug. 6, 2026

(51) Int. Cl.

*G06Q 20/40* (2012.01)
*G06Q 20/36* (2012.01)
*G06Q 20/38* (2012.01)

(52) U.S. Cl.

CPC ......... *G06Q 20/401* (2013.01); *G06Q 20/367* (2013.01); *G06Q 20/3827* (2013.01)

(58) Field of Classification Search

CPC . G06Q 20/401; G06Q 20/367; G06Q 20/3827
See application file for complete search history.

(56) References Cited

U.S. PATENT DOCUMENTS 10,832,247 B2 11/2020 Durvasula et al.
11,823,141 B2 11/2023 Wang
(Continued)

FOREIGN PATENT DOCUMENTS

CN 112990621 B 12/2024
IN 202341001499 9/2024
KR 10-2737339 B1 12/2024

OTHER PUBLICATIONS

Godfrey-Welch, Darlene et al, "Blockchain in Payment Card Systems", SMU Data Science Review, vol. 1, No. 1, Article 3, 2018, 44 pages.

(Continued)

*Primary Examiner* — Scott S Trotter
(74) *Attorney, Agent, or Firm* — Panitch Schwarze Belisario & Nadel LLP

(57) ABSTRACT

A method for stand-in authorization including: receiving, by a processing server, an authorization message including a specific payment account identifier and a transaction amount; transmitting the authorization message to an issuer of a payment account associated with the specific payment account identifier; triggering, by the processing server, in response to a lack of reply from the issuer, a stand-in authorization process including (i) transmitting, to a node in a first blockchain network, a request for limit validation, (ii) identifying, by the node, a user account profile including the transaction account, (iii) determining, by the node, that the transaction amount exceeds the available credit amount of the transaction account, and (iv) executing, by the node, a smart contract divide the transaction amount into a first and second transaction amounts for application the transaction account and an additional transaction account included in the user account profile.

18 Claims, 4 Drawing Sheets

(56) References Cited

U.S. PATENT DOCUMENTS

| | | | | |
|---|---|---|---|---|
| 2017/0132625 | A1* | 5/2017 | Kennedy | G06Q 20/065 |
| 2017/0132626 | A1 | 5/2017 | Kennedy | |
| 2017/0148016 | A1* | 5/2017 | Davis | G06Q 20/3827 |
| 2017/0161733 | A1* | 6/2017 | Koletsky | G06Q 20/405 |
| 2017/0236121 | A1* | 8/2017 | Lyons | G06Q 20/06 705/71 |
| 2017/0270493 | A1* | 9/2017 | Lugli | G06Q 20/10 |
| 2017/0323294 | A1* | 11/2017 | Rohlfing | G06Q 20/3825 |
| 2020/0265435 | A1* | 8/2020 | Bankston | H04L 9/006 |
| 2021/0026843 | A1 | 1/2021 | Malkhi et al. | |
| 2022/0114588 | A1 | 4/2022 | Stafford | |
| 2023/0368293 | A1 | 11/2023 | Navarro et al. | |

OTHER PUBLICATIONS

Notification of Transmittal of the International Search Report and Written Opinion of the International Searching Authority issued on Jun. 16, 2026, in corresponding International Application No. PCT/US2026/011334 (8 Pages).

* cited by examiner

300

METHOD AND SYSTEM TO IMPROVE STAND-IN TRANSACTIONS APPROVAL THROUGH BLOCKCHAIN INTEROPERABILITY AND SMART CONTRACTS

FIELD

The present disclosure relates to systems and methods that enable a payment network to authorize transactions on behalf of an issuer and, more specifically, to the triggering of a stand-in authorization utilizing blockchain interoperability and smart contracts.

BACKGROUND

Payment networks, also known as transaction processing networks, involve significant hardware and infrastructure that are specifically configured to quickly process payment transactions from anywhere in the world using a vast, interconnected network. Payment networks often operate using detailed rules and standards to ensure accuracy, security, efficiency and otherwise maintain order in the processing of potentially trillions of transactions every year. Typically, in an uninterrupted payment transaction processing flow, a payment instrument (e.g., credit card, debit card, mobile device, etc.) is presented for payment at a merchant terminal. The merchant terminal generates an authorization request, which is transmitted to an acquirer, which then forwards the authorization request to a payment network for processing. To process the payment transaction, the payment network communicates with an issuer/issuer institution (e.g., bank) of a payment account associated with the payment instrument and either approves or denies the transaction. The issuer responds to the authorization request with an authorization response, which is communicated to the merchant terminal via the payment network and the acquirer.

There may be instances, however, in which a payment network may not be able reach an issuer or the issuer may be non-responsive. One such instance may include network/infrastructure outages. For example, the issuer may be experiencing a power outage or a network/infrastructure outage and may not receive an authorization request for a payment transaction submitted by the payment network. Thus, the issuer may be non-responsive. Such instances may result in, for example, significantly long response and processing times, the payment transaction not being approved, or the need to submit additional authorization requests in which alternative payment cards (associated with different card issuers) are used thereby requiring multiple communications to and from the payment network tying up bandwidth on the payment network.

Some payment networks process transaction authorization requests on behalf of an issuer if certain conditions are met. For example, a payment network may provide stand-in processing for an issuer (i.e., process transaction on behalf of the issuer) if the issuer is unavailable for communication or is otherwise non-responsive, such as in the instances of unplanned network/infrastructure outages, during planned or unplanned maintenance, etc. Such stand-in processing ensures the continuance of payment transaction processing without interruption in the event of maintenance or such outages.

Stand-in processing has a relatively lower approval rate as compared to traditional processing. The impact associated with such a lower approval rate is significant when the outage is due to, for example, a natural disaster, and a consumer is in urgent need of funds. Typically, stand-in processing has configurable templates, but they are generalized for an account range/brand product. Dynamic decisioning leverages automatic intelligence (AI) to eliminate complex manual configurations and imitate issuer's decisioning patterns but is prone to false positives/negative and is a black box model. Moreover, the configuration of existing transaction systems fails to provide functionality or mechanisms for a payment network to obtain information about a user's transaction account (i.e., payment account used in the transaction with the merchant terminal) to render an authorization decision when there are network/infrastructure outages, which can lead to a number of problems. For example, when an issuer is nonresponsive, a payment network may send multiple communications to the issuer until possibly declining an authorization request. In another example, the payment network may inform a merchant terminal that an issuer is non-responsive such that the merchant terminal requests an alternative form of payment. In such an instance, multiple communications occur between the merchant terminal and the payment network. Thus, an issuer is experiencing an outage may result in a significant number of transmissions between the payment network and the issuer and/or the payment network and the merchant terminal, which may put a strain on communication networks and slow down processing times.

There is a need for a technological solution that enables improved processing of stand-in transactions (stand-in processing), that allows higher approval rates with transparency in case of longer outages, and that reduces unnecessary communications to and from the payment network thereby maintaining or reducing processing times and reducing bandwidth usage on the payment network.

SUMMARY

The present disclosure provides a description of systems and methods for enabling a payment network to authorize transactions on behalf of an issuer utilizing blockchain interoperability and smart contracts.

A method for stand-in authorization using blockchain including receiving, by a receiver of a processing server within a payment network, an authorization message from a merchant terminal for a transaction, said authorization message including at least a specific payment account identifier, a transaction amount, and a merchant identifier; transmitting, by a transmitter of the processing server, the authorization message to an issuer of a payment account associated with the specific payment account identifier; and triggering, by a processor of the processing server, in response to a lack of reply from the issuer a stand-in authorization process. The stand-in authorization process includes (i) transmitting, by the transmitter, a request for limit validation to a node in a first blockchain network associated with the issuer, via a second blockchain network in communication with the payment network, wherein said request includes at least the specific payment account identifier and the transaction amount, (ii) identifying, by the node, a user account profile including the transaction account based on the specific payment account identifier included in the request, (iii) determining, by the node, that the transaction amount included in the request exceeds the available credit amount of the transaction account included in the identified user account profile, (iv) determining, by the node, that the identified user account profile includes at least one additional transaction account in which an available credit amount thereof in combination with the available credit amount of the transaction account is equal to or greater than the transaction amount, and (v) executing, by the node, a smart contract stored in a blockchain of the first blockchain network, using the request for limit validation as input. The execution of the smart contract includes dividing the transaction amount into a first transaction amount for application to the available credit of the transaction account and a second transaction amount for application to the available credit of the additional transaction account and recording payment details on the blockchain.

A system for stand-in authorization using blockchain includes a payment network including a processing server; a merchant terminal; an issuer of a payment account associated with a payment account identifier; a first blockchain network associated with the issuer; and a second blockchain network in communication with the first blockchain network and the payment network. A receiver of the processing server within the payment network is configured to receive an authorization message from the merchant terminal for a transaction, said authorization message including at least a specific payment account identifier, a transaction amount, and a merchant identifier. A transmitter of the processing server is configured to transmit the authorization message to the issuer of the payment account. A processor of the processing server is configured to trigger, in response to a lack of reply from the issuer, a stand-in authorization process. The stand-in authorization process includes the transmitter of the processing server transmitting a request for limit validation to a node in the first blockchain network, via the second blockchain network, wherein said request includes at least the specific payment account identifier and the transaction amount, the node (i) identifying a user account profile including the transaction account based on the specific payment account identifier included in the request, (ii) determining that the transaction amount included in the request exceeds an available credit amount of the transaction account included in the identified user account profile, (iii) determining that the identified user account profile includes at least one additional transaction account in which an available credit amount thereof in combination with the available credit amount of the transaction account is equal to or greater than the transaction amount, and (iv) executing a smart contract stored in a blockchain of the first blockchain network, using the request for limit validation as input. The execution of the smart contract includes dividing the transaction amount into a first transaction amount for application to the available credit of the transaction account and a second transaction amount for application to the available credit of the additional transaction account and recording payment details on the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Stand-In Authorization Using Blockchain

Figure 1:
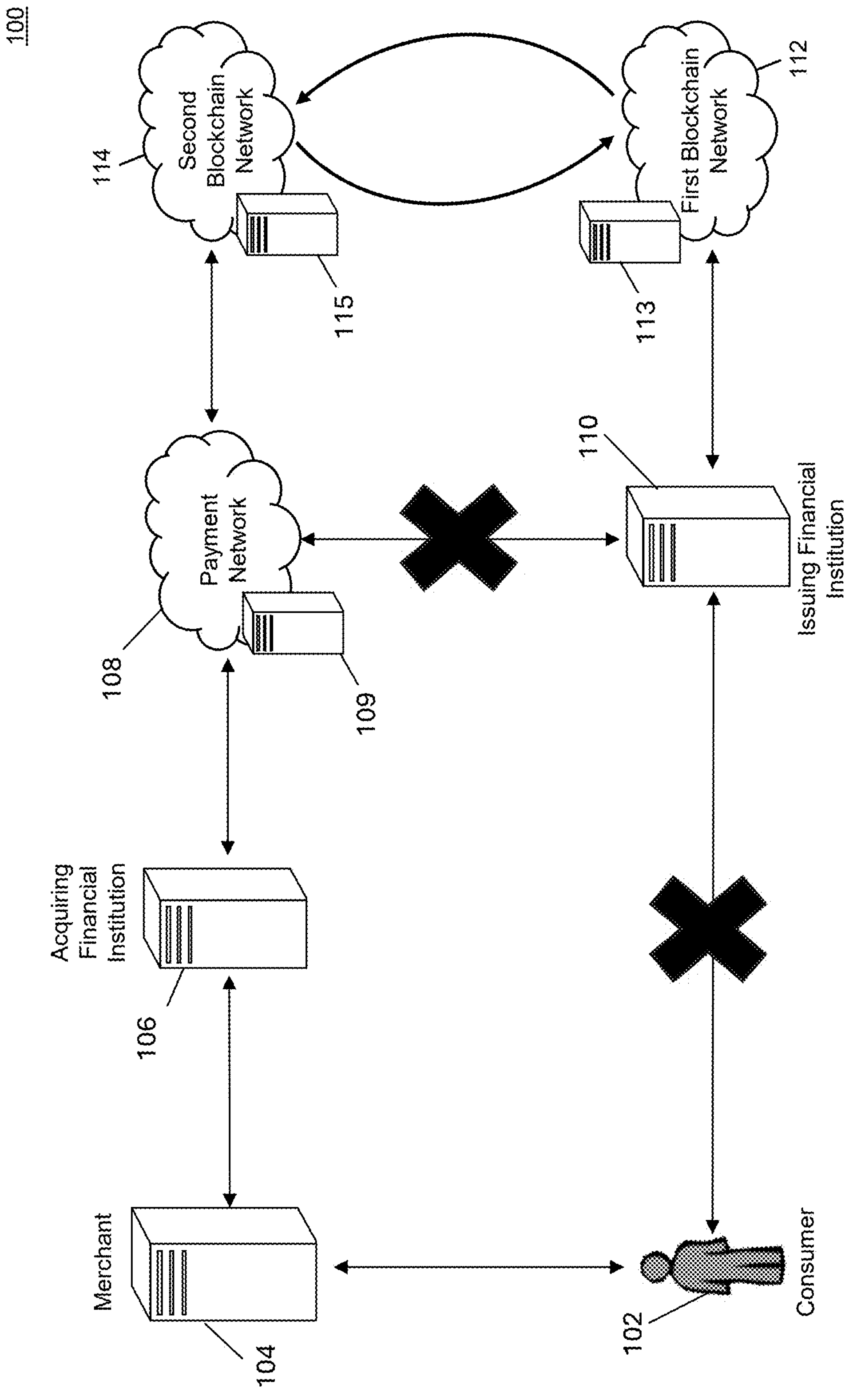
FIG. 1 is a block diagram illustrating a high-level system architecture for stand-in authorization using blockchain in accordance with exemplary embodiments.

FIG. 1 illustrates a system 100 for enabling stand-in processing when an issuer (i.e., issuing financial institution 110) is unavailable. The system 100 includes a consumer/user 102, merchant 104, acquiring financial institution 106 (also known as acquirer or merchant acquirer), payment network 108, the issuer 110, a first blockchain network 112, and a second blockchain network 114.

Traditionally, a payment transaction is processed by a payment network (e.g., payment network 108). As discussed herein, the term "payment network" can refer to a system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Referring to FIG. 1, when the consumer 102 initiates a transaction with the merchant 104 either electronically (e.g., using a mobile application on his/her mobile device, a web interface, an application programming interface (API), or any other platform suitable for interacting with the merchant to purchase goods and/or services) or in person in a brick-and-mortar store (e.g., via a merchant terminal-point-of-sale (POS) terminal), the consumer 102 furnishes payment information to the merchant 104. For example, an in-person transaction may include the consumer 102 presenting a payment card (e.g., credit card, debit card, etc.) to the POS terminal by which transaction account details (e.g., payment account identifier, expiration date, card verification value (CVV)) stored on the payment card are obtained. The merchant 104 submits transaction details (e.g., transaction account details, payment amount, etc.) to their acquirer 106. An authorization request for the transaction (including the transaction details, payment amount, merchant identifier, etc.) is then submitted to the payment network 108, via a processing server 109 associated therewith, for processing. To process the payment transaction, the payment network 108 transmits the authorization message to the issuer 110 associated with the consumer's payment account to either approve or deny the transaction. However, as shown in FIG.

1, the payment network 108 is unable to communicate with the issuer 110. For example, the issuer 110 may be experiencing a power outage or a network/infrastructure outage and, thus, will be non-responsive to the payment network's transmission of the authorization message.

A lack of response from the payment network 108 triggers the processing server 109 of the payment network 108 to initiate a stand-in authorization process in order to enable the transaction to continue without interruptions. For example, there may be a predetermined period of time previously established between the payment network 108 and the issuer 110 that, when elapsed after an authorization request is submitted to the issuer 110, the payment network 109 initiates the stand-in authorization process.

Figure 2:
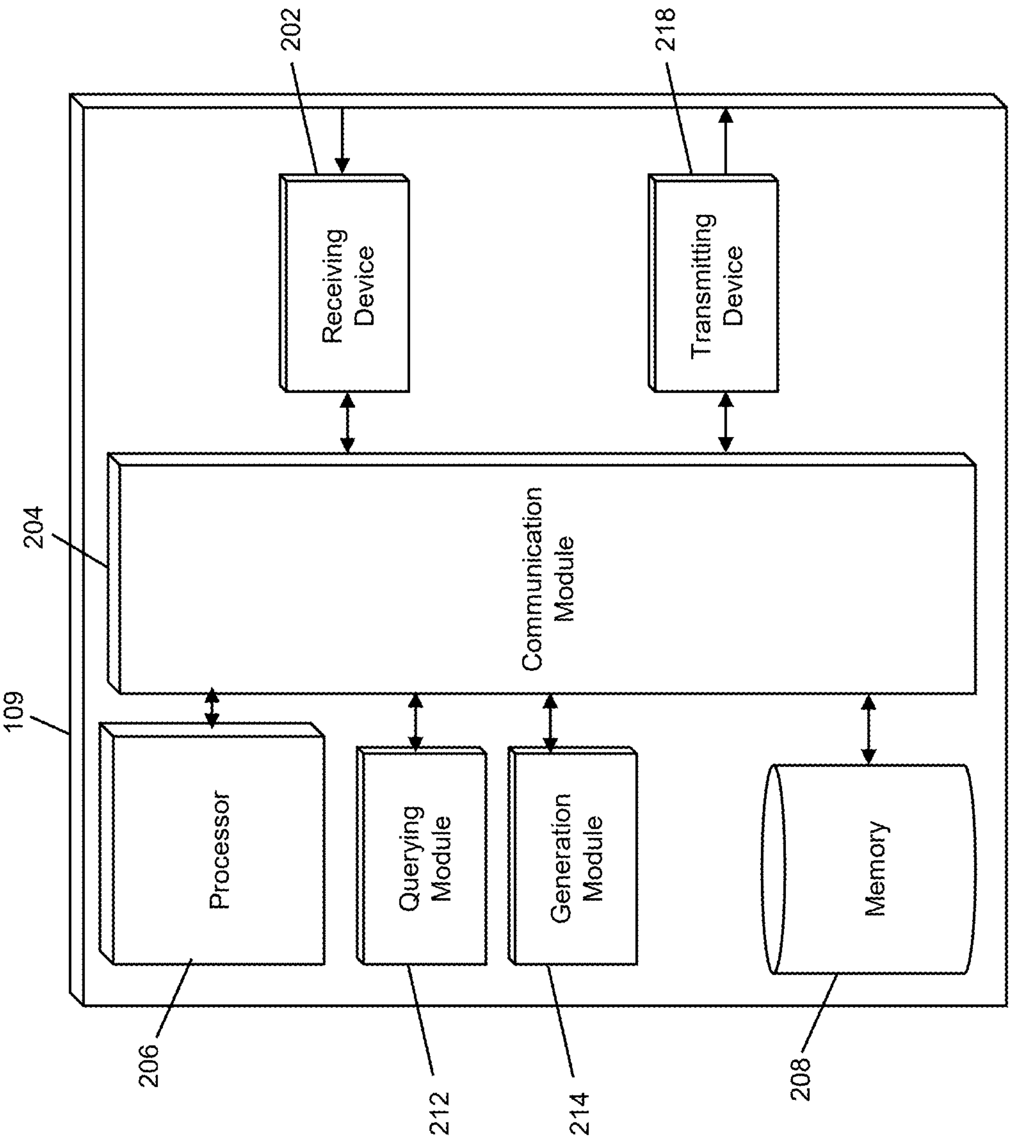
FIG. 2 is a block diagram illustrating a processing server of the system of FIG. 1 for stand-in authorization using blockchain in accordance with exemplary embodiments.

The payment network 109 and the issuer 110 maintain a network of interoperable blockchains in respective blockchain networks. Each blockchain network may be comprised of a plurality of blockchain nodes. Each blockchain node may be a computing system, such as illustrated in FIG. 2 or 5, discussed in more detail below, that is configured to perform functions related to the processing and management of the blockchain, including for example generation of blockchain data values, verification of proposed blockchain transactions, verification of digital signatures, generation of new blocks, validation of new blocks, maintenance of a copy of the blockchain, etc.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node in the respective blockchain network prior to the generation and addition of a new block to the blockchain in order for the change to be made permanent. Computational and communication limitations can make such a modification exceedingly difficult, if not impossible, thus rendering the blockchain immutable.

In some embodiments, a blockchain can be used to store information regarding transactions conducted between two entities (e.g., consumer/user 102 and merchant 104). Each blockchain data value stored in the blockchain can correspond to a transaction or other storage of data, as applicable.

With reference to FIG. 1, the issuer 110 has access to a first blockchain in the first blockchain network 112. The first blockchain stores a plurality of user account profiles. Each user account profile includes information on active transaction accounts associated with the user (e.g., consumer). The information includes payment account identifiers associated with each respective active transaction account, account limits of each respective active transaction account, account balances of each respective active transaction account that are updated in real time, and an available credit amount of each active account that is updated in real time. The first blockchain in the first blockchain network 112 is accessible to only the issuer 110 except in the cases of network/infrastructure outages. In such instances, the issuer 110 shares access to the first blockchain with the payment network 109 for a fixed period of time.

The payment network 109 has access to a second blockchain stored in the second blockchain network 114, which stores authorization requests and authorization responses for card transactions. For example, the second blockchain may store a plurality of user account profiles, where each user account profile includes information including transaction accounts associated with the user as well as any authorization requests and responses associated with respective transaction accounts.

When the stand-in authorization process is initiated, the processing server 109 of the payment network 108 communicates with the second blockchain network 114 by submitting a request for limit validation to a second blockchain node 115 of a plurality of blockchain nodes (not depicted) of the second blockchain network 114. The request for limit validation includes the authorization request, which includes at least the payment account identifier used in the transaction as well as the transaction amount. The request for limit validation can include any additional information necessary for the second blockchain node 115 to perform functions disclosed herein. In some embodiments, prior to submitting the request for limit validation to the second blockchain node 115, the payment network 108 may transmit a user authorization request to the merchant 104 (e.g., merchant terminal, POS terminal, etc.) requesting the user's authorization to proceed. If the user does not want to proceed, he/she may decline, and the transaction would then be terminated. If the user wishes to proceed, then the payment network 108 would proceed with transmitting the request for limit validation to the second blockchain network 114.

The second blockchain node 115 records the authorization request in the second blockchain and forwards the request for limit validation to a first blockchain node 113 of a plurality of blockchain nodes (not depicted) of the first blockchain network 112. Using the payment account identifier included in the request for limit validation, the first blockchain node 113 identifies a user account profile stored in the first blockchain by matching the payment account identifier included in the request for limit validation with a payment account identifier stored in the user account profile.

The second blockchain node 115 then determines whether the transaction amount included in the request for limit validation exceeds an available credit amount of the transaction account included in the identified user account. If the transaction amount does not exceed the available credit amount of the transaction account, the first blockchain node 113 approves the transaction, records the transaction details on the first blockchain, and issues an appropriate response to the second blockchain node 115 of the second blockchain network 115. However, if the transaction amount does exceed the available credit amount of the transaction account, the first blockchain node 113 determines whether the identified user account profile includes at least one additional transaction account. If the identified user account profile does not include an additional transaction account, then the transaction would not be permitted to continue (i.e., it would be denied). If, however, the identified user account profile includes at least one additional transaction account, the first blockchain node 113 determines whether an available credit amount of the at least one additional transaction account in combination with the available credit amount of the transaction account (associated with the transaction account identifier used in the transaction) is equal to or greater than the transaction amount. If the at least one additional transaction account does not include sufficient available credit, then the transaction is not permitted to continue (i.e., it would be denied). If, however, the at least one additional transaction account does include an available credit amount that in combination with the available credit amount of the transaction account (associated with the transaction account identifier used in the transaction) is equal to or greater than the transaction amount, the transaction is permitted to continue.

Smart contracts and other mechanisms may be used to ensure that the transaction is carried out. A smart contract can be a self-executable function that executes using supplied data and performs one or more actions as a result. In some embodiments, a smart contract can be supplied with a request for limit validation for carrying out the transaction if it is permitted to continue (as described above). In other embodiments, the first blockchain may store smart contracts for carrying out transactions when they are permitted to continue (as described above). For example, a smart contract may be established for and stored in each respective user account profile.

When the transaction is permitted to continue, the first blockchain node 113 then executes a smart contract (e.g., stored in the first blockchain). In some cases, the first blockchain node 113 parses appropriate data from the request for limit validation (e.g., identified via applicable standard(s) and the information included in the request) and supply the identified data as inputs to the smart contract. In other cases, the request for limit validation itself may be used as input to the smart contract, where the smart contract may identify necessary data in the request itself. The smart contract may then self-execute and perform any necessary functions as designed by the contract. Specifically, execution of the smart contract includes dividing the transaction amount into a first transaction amount for application to the available credit of the transaction account and a second transaction amount for application to the available credit of the additional transaction account. For example, a transaction amount is for $12,000. The first blockchain node 113 determines that the transaction account (associated with the transaction account identifier used in the transaction) only has an available credit of $8,000, however, the at least one additional transaction account (identified in the user account profile) has an available credit of $5,000. Therefore, the transaction account and the at least one additional transaction account, in combination, has $13,000 available. The first blockchain node 113 then divides the $12,000 transaction amount into a first amount of $8,000 for application to the available $8,000 on the transaction account (associated with the transaction account identifier used in the transaction) and into a second amount of $4,000 for application to the available $5,000 on the at least one additional account. The account balances and available credit of the transaction account and the at least one additional transaction account are then updated in real time, and an available credit amount of each active account that is updated in real time. Execution of the smart contract also includes recording the transaction details (i.e., a manner in which the transaction amount was divided and the transaction accounts to which the first transaction amount and the second transaction amount were applied) on the first blockchain and generating a response message including the payment details and an indication that the transaction should be approved.

The first blockchain node 113 transmits the response message to the second blockchain node 115 of the second blockchain network 114 where the response message is recorded in the appropriate user account profile (along with the associated authorization request). The second blockchain node 115 then forwards the response message to the processing server 109 of the payment network 108, which approves the transaction on behalf of the issuer based on the transaction details included in the response message. An authorization response is then forwarded to the merchant 104 (via the acquirer 106), which notifies the consumer 102.

The payment network 108 detects that the issuer 110 is now responsive and transmits a notification message, including the payment details, thereto. In some embodiments, if the issuer 110 had been experiencing a power outage or a network/infrastructure outage, once the outage has been resolved, the issuer 110 may issue notifications to external entities (including, e.g., the payment network 108 and first blockchain network 112) that the outage has been resolved. In response to receiving the notification message from the payment network 108, the issuer 110 may confirm with the first blockchain network 112 that the first blockchain reflects the same transaction details as those included in the notification message received from the payment network.

The payment network 109 also communicates with the acquirer 106 by transmitting an authorization response indicating that transaction has been approved. The authorization response includes the transaction details (i.e., a manner in which the transaction amount was divided and the transaction accounts to which the first transaction amount and the second transaction amount were applied), which are forwarded to the consumer 102.

The methods and systems discussed herein enable a traditional payment transaction to continue, without interruption, in the event that the issuer 110 is experiencing a power outage or network/infrastructure outage and is unavailable to approve/deny the transaction. Enabling the payment network 108 to trigger a stand-in authorization using blockchain interoperability (the first and second blockchain networks 112, 114) and smart contracts in order to authorize transactions on behalf of the issuer 110 reduces unnecessary communications to and from the payment network 108, which would normally occur in traditional systems. Thus, transaction processing times during such outages can be maintained or even reduced, thereby reducing bandwidth usage on the payment network 108.

Processing Server

FIG. 2 illustrates an embodiment of the processing server 109 of the payment network 108 of FIG. 1. It will be apparent to persons having skill in the relevant art that the embodiment of the processing server 109 illustrated in FIG. 2 is provided as illustration only and cannot be exhaustive to all possible configurations of the processing server 109 suitable for performing the functions as discussed herein. For example, the computer system 400 illustrated in FIG. 4 and discussed in more detail below can be a suitable configuration of the processing server 109.

The processing server 109 may include a receiving device 202. The receiving device 202 may be configured to receive data over one or more networks via one or more network protocols. In some instances, the receiving device 202 may be configured to receive data from the acquirer 106, the second blockchain network 114, the issuer 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data can be superimposed or otherwise encoded on the data signal and decoded, parsed, read, or otherwise obtained via receipt of the data signal by the receiving device 202. In some instances, the receiving device 202 may include a parsing module for parsing a received data signal to obtain the data superimposed thereon. For example, the receiving device 202 may include a parser program configured to receive and transform the received data signal into usable input for the functions performed by the processing device/processor 206 to carry out the methods and systems described herein.

The receiving device 202 may be configured to receive data signals electronically transmitted via acquirer 106 that can be superimposed or otherwise encoded with authorization requests for payment transactions. The authorization requests can be superimposed or otherwise encoded with payment transaction data including a transaction amount, transaction account number/identifier associated with a transaction/financial account of the consumer/user 102, a merchant identifier associated with the merchant 104, and any other suitable transaction data. The receiving device 202 may also be configured to receive data signals electronically transmitted by nodes of the second blockchain network 114, which can be superimposed or otherwise encoded with responses messages (in response to validation limit requests). The receiving device 202 may also be configured to receive data signals electronically transmitted by issuers 110, which can be superimposed or otherwise encoded with authorization responses and other response messages.

The processing server 109 may also include a communication module 204. The communication module 204 may be configured to transmit data between modules, engines, databases, memories, and other components of the processing server 109 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 109 and external components of the processing server 109, such as externally connected databases, display devices, input devices, etc.

The processing server 109 may also include a processing device 206. The processing device 206 may be configured to perform the functions of the processing server 109 discussed herein as will be apparent to persons having skill in the relevant art. In some embodiments, the processing device 206 may include and/or be comprised of a plurality of engines and/or modules specially configured to perform one or more functions of the processing device 206, such as a querying module (not depicted), generation module (not depicted), and an analysis module (not depicted), etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 109 may also include a memory 208. The memory 208 may be configured to store data for use by the processing server 109 in performing the functions discussed herein, such as public and private keys, symmetric keys, etc. The memory 208 can be configured to store data using suitable data formatting methods and schema and can be any suitable type of memory, such as read-only memory, random access memory, etc. The memory 208 can include, for example, encryption keys and algorithms, communication protocols and standards, data formatting standards and protocols, program code for modules and application programs of the processing device, and other data that can be suitable for use by the processing server 109 in the performance of the functions disclosed herein as will be apparent to persons having skill in the relevant art. In some embodiments, the memory 208 can be comprised of or can otherwise include a relational database that utilizes structured query language for the storage, identification, modifying, updating, accessing, etc. of structured data sets stored therein. The memory 208 can be configured to store, for example, transaction account maps, device profiles, cryptographic keys including public keys and/or private keys, communication data, encryption algorithms, scoring algorithms, machine learning algorithms, pattern-matching algorithms, transaction data, transaction message standards, transaction message formatting rules, etc.

The processing server 109 may include a querying module 212. The querying module 212 may be configured to execute queries on databases to identify information. The querying module 212 may receive one or more data values or query strings and can execute a query string based thereon on an indicated database. The querying module 212 may then output the identified information to an appropriate engine or module of the processing server 109 as necessary.

The processing server 109 may also include a generation module 214. The generation module 214 may be configured to generate data for use by the issuing processing server 109 in performing the functions discussed herein. The generation module 214 may receive instructions as input, may generate data based on the instructions, and may output the generated data to one or more modules of the processing server 109. For example, the generation module 214 may be configured to generate transaction messages, notification messages, etc.

The processing server 109 may also include a transmitting device 210. The transmitting device 210 may be configured to transmit data over one or more networks via one or more network protocols. In some instances, the transmitting device 210 may be configured to transmit data to the acquirer 106, the second blockchain network 114, the issuer 110, and other entities via one or more communication methods, local area networks, wireless area networks, cellular communication, Bluetooth, radio frequency, the Internet, etc. In some embodiments, the transmitting device 210 may be comprised of multiple devices, such as different transmitting devices for transmitting data over different networks, such as a first transmitting device for transmitting data over a local area network and a second transmitting device for transmitting data via the Internet. The transmitting device 210 may electronically transmit data signals that have data superimposed that can be parsed by a receiving computing device. In some instances, the transmitting device 210 may include one or more modules for superimposing, encoding, or otherwise formatting data into data signals suitable for transmission.

The transmitting device 210 may be configured to electronically transmit data signals to the acquirer 106 that are superimposed or otherwise encoded with transaction responses, authorization responses, transaction details, etc. The transmitting device 210 may also be configured to electronically transmit data signals to the second blockchain network 114, and issuer 110, which can be superimposed or otherwise encoded with data requests, such as requests for limit validation, authorization requests, authorization responses, etc.

Exemplary Method for Stand-In Authorization Using Blockchain

Figure 3:
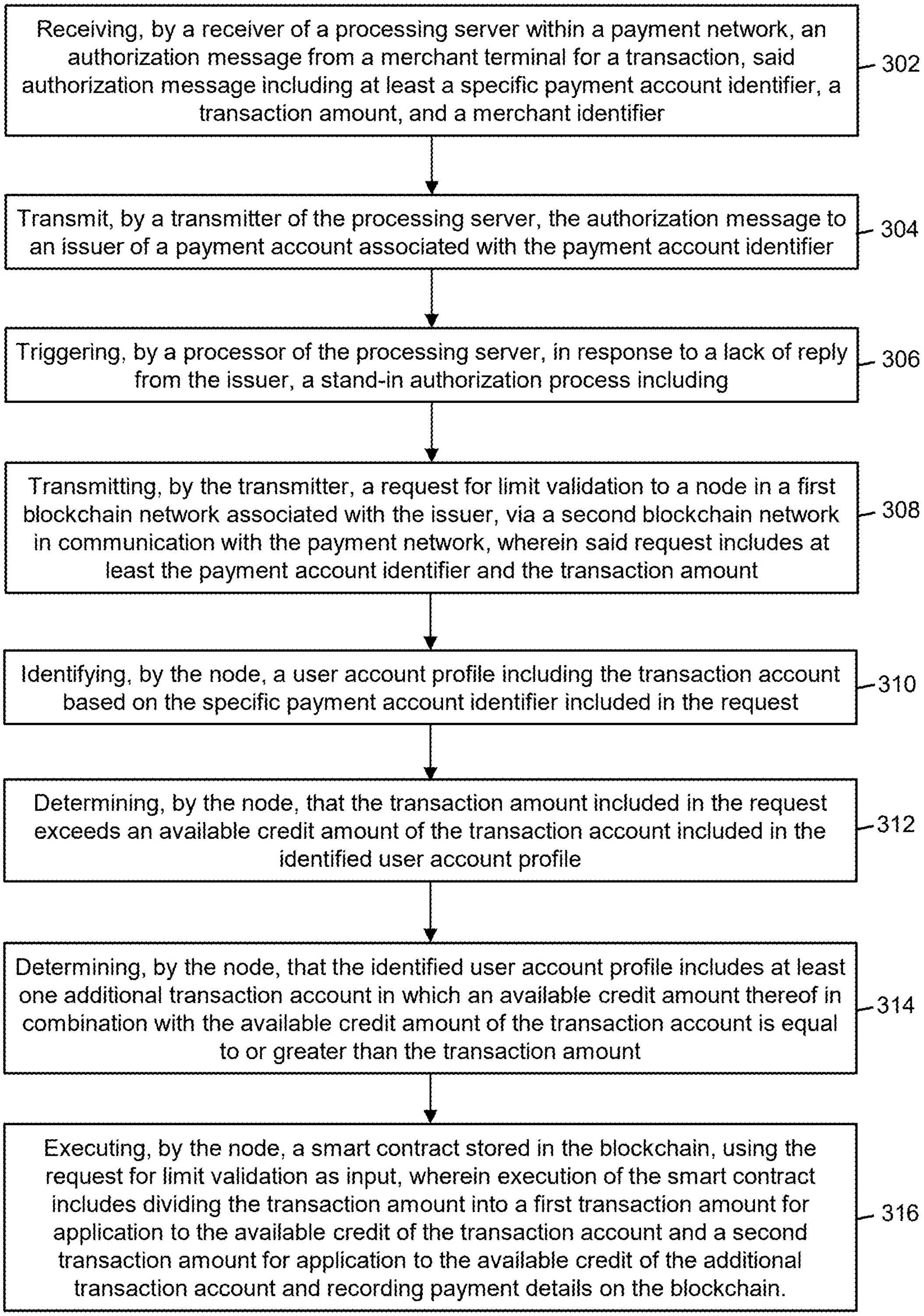
FIG. 3 is a flow chart illustrating an exemplary method for stand-in authorization using blockchain in accordance with exemplary embodiments.

FIG. 3 illustrates a method 300 for stand-in authorization using blockchain in accordance with exemplary embodiments.

In step 302, an authorization message (e.g., authorization request) for a payment transaction may be received by a receiver (receiving device 202) of a processing server (processing server 109) within a payment network (payment network 108). The authorization message originates from a merchant terminal (merchant 104) for a transaction and includes at least a specific payment account identifier, a transaction amount, and a merchant identifier. More specifically, the authorization message is formatted according to one or more standards and includes a plurality of data elements storing at least the specific payment account identifier, the transaction amount, and the merchant identifier. In step 304, a transmitter (transmitting device 210) of the processing server (processing server 109) transmits the authorization message to an issuer (issuing financial institution 110) of a payment account associated with the payment account identifier. In response to a lack of reply from the issuer (issuing financial institution 110), in step 306, a processor (processor 206) of the processing server (processing server 109) triggers a stand-in authorization process.

In step 308, the transmitter (transmitting device 210) of the processing server (processing server 109) transmits a request for limit validation to a node (first blockchain node 113) in a first blockchain network (first blockchain network) 112 associated with the issuer (issuing financial institution 110), via a second blockchain network (second blockchain network 114) in communication with the payment network (payment network 108), wherein the request includes at least the specific payment account identifier and the transaction amount. In step 310, the node (first blockchain node 113) identifies a user account profile including the transaction account based on the specific payment account identifier included in the request. In step 312, the node (first blockchain node 113) determines that the transaction amount included in the request exceeds an available credit amount of the transaction account included in the identified user account profile. In step 314, the node (first blockchain node 113) determines that the identified user account profile includes at least one additional transaction account in which an available credit amount thereof in combination with the available credit amount of the transaction account is equal to or greater than the transaction amount and, in step 316, the node (first blockchain node 113) executes a smart contract stored in a blockchain (first blockchain) of the first blockchain network (first blockchain network 112) using the request for limit validation as input. Execution of the smart contract includes dividing the transaction amount into a first transaction amount for application to the available credit of the transaction account and a second transaction amount for application to the available credit of the additional transaction account and recording payment details on the blockchain.

In some embodiments, the method further includes the node (first blockchain node 113) in the first blockchain network (first blockchain network 112) transmitting a response a response message to the processing server (processing server 109) in the payment network (payment network 108), via the second blockchain network (second blockchain network 114), wherein the response message includes the payment details and an indication that the transaction should be approved.

In some embodiments, the node (first blockchain node 113) of the first blockchain network (first blockchain network 112) (i) updates the account balance of the transaction account and the account balance of the at least one additional transaction account, stored in the user account profile, based on the payment details and (ii) updates the available credit of the transaction account and the available credit of the at least one additional transaction account, stored in the user account profile, based on the payment details.

In some embodiments, the processor (processor 206) of the processing server (processing server 109) detects when the issuer is responsive and transmits a notification that includes the payment details to the issuer.

In some embodiments, before transmitting the request for limit validation to the node (first blockchain node 113) in the first blockchain network (first blockchain network 112) associated with the issuer (issuing financial institution 110), the transmitter (transmitting device 210) of the processing server (processing server 206) transmits a user authorization request to the merchant terminal (merchant 104), wherein the user authorization request includes a request for user permission to request limit validation.

In some embodiments, before transmitting the request for limit validation to the node (first blockchain node 113) in the first blockchain network (first blockchain network 112) associated with the issuer (issuing financial institution 110), the processing server (processing server 109) of the payment network 109 performs a set of validation services. For example, the processing server 109 may perform (1) chip/contactless chip/token validation, (2) validation of the card validation code (CVC), (3) validation of Identity Check Accountholder Authentication Value (AAV), etc.

Computer System Architecture

Figure 4:
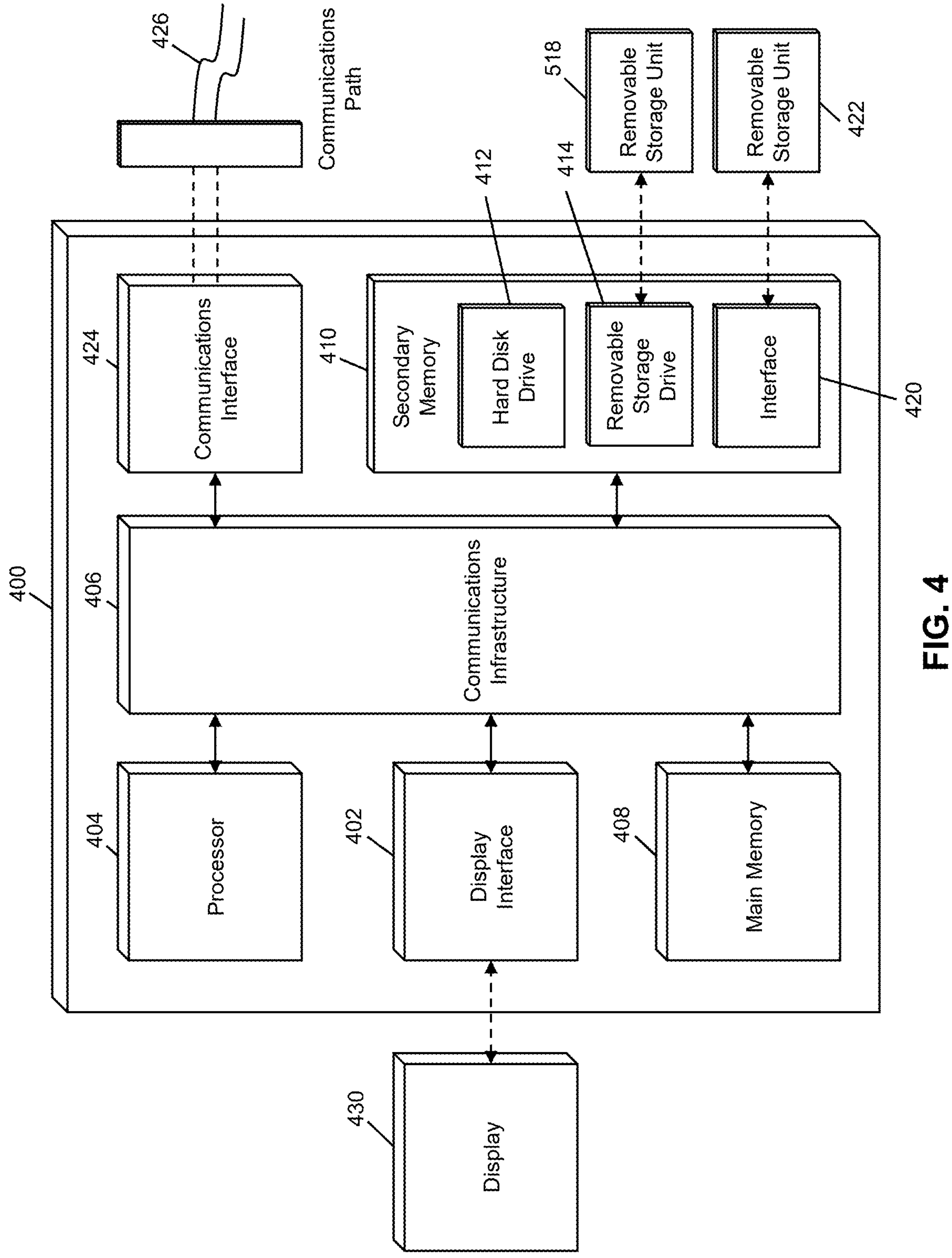
FIG. 4 is a block diagram illustrating a computer system architecture in accordance with exemplary embodiments.

FIG. 4 illustrates a computer system 400 in which embodiments of the present disclosure, or portions thereof, can be implemented as computer-readable code. For example, the processing server 109, blockchain nodes 113, 115, issuing financial institution 108, and acquiring financial institution can be implemented in the computer system 400 using hardware, non-transitory computer readable media having instructions stored thereon, or a combination thereof and can be implemented in one or more computer systems or other processing systems. Hardware can embody modules and components used to implement the methods of FIG. 3.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 404 can be a special purpose or a general purpose processor device specifically configured to perform the functions discussed herein. The processor device 404 can be connected to a communications infrastructure 406, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 can also include a main memory 408 (e.g., random access memory, read-only memory, etc.), and can also include a secondary memory 410. The secondary memory 410 can include the hard disk drive 412 and a removable storage drive 414, such as a floppy disk drive, a magnetic tape drive, an optical disk drive, a flash memory, etc.

The removable storage drive 414 can read from and/or write to the removable storage unit 418 in a well-known manner. The removable storage unit 418 can include a removable storage media that can be read by and written to by the removable storage drive 414. For example, if the removable storage drive 414 is a floppy disk drive or universal serial bus port, the removable storage unit 418 can be a floppy disk or portable flash drive, respectively. In one embodiment, the removable storage unit 418 can be non-transitory computer readable recording media.

In some embodiments, the secondary memory 410 can include alternative means for allowing computer programs or other instructions to be loaded into the computer system 400, for example, the removable storage unit 422 and an interface 420. Examples of such means can include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art. For example, a main memory or secondary memory of the first and second blockchain nodes 113, 115 may include user account profile databases that store a plurality of user account profiles.

The computer system 400 can also include a communications interface 424. The communications interface 424 can be configured to allow software and data to be transferred between the computer system 400 and external devices. Exemplary communications interfaces 424 can include a modem, a network interface (e.g., an Ethernet card), a communications port, a PCMCIA slot and card, etc. Software and data transferred via the communications interface 424 can be in the form of signals, which can be electronic, electromagnetic, optical, or other signals as will be apparent to persons having skill in the relevant art. The signals can travel via a communications path 426, which can be configured to carry the signals and can be implemented using wire, cable, fiber optics, a phone line, a cellular phone link, a radio frequency link, etc.

The computer system 400 can further include a display interface 402. The display interface 402 can be configured to allow data to be transferred between the computer system 400 and external display 430. Exemplary display interfaces 402 can include high-definition multimedia interface (HDMI), digital visual interface (DVI), video graphics array (VGA), etc. The display 430 can be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 408 and secondary memory 410, which can be memory semiconductors (e.g., DRAMs, etc.). These computer program products can be means for providing software to the computer system 400. Computer programs (e.g., computer control logic) can be stored in the main memory 408 and/or the secondary memory 410. Computer programs can also be received via the communications interface 424. Such computer programs, when executed, can enable computer system 400 to implement the present methods as discussed herein. In particular, the computer programs, when executed, can enable processor device 404 to implement the methods illustrated by FIG. 3, as discussed herein. Accordingly, such computer programs can represent controllers of the computer system 400. Where the present disclosure is implemented using software, the software can be stored in a computer program product and loaded into the computer system 400 using the removable storage drive 414, interface 420, and hard disk drive 412, or communications interface 424.

The processor device 404 can comprise one or more modules or engines configured to perform the functions of the computer system 400. Each of the modules or engines can be implemented using hardware and, in some instances, can also utilize software, such as corresponding to program code and/or programs stored in the main memory 408 or secondary memory 410. In such instances, program code can be compiled by the processor device 404 (e.g., by a compiling module or engine) prior to execution by the hardware of the computer system 400. For example, the program code can be source code written in a programming language that is translated into a lower level language, such as assembly language or machine code, for execution by the processor device 404 and/or any additional hardware components of the computer system 400. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for reconciliation of published events using blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for stand-in authorization using blockchain, comprising:

receiving, by a receiver of a processing server within a payment network, an authorization message from a merchant terminal for a transaction, said authorization message including at least a specific payment account identifier, a transaction amount, and a merchant identifier;

transmitting, by a transmitter of the processing server, the authorization message to an issuer of a payment account associated with the payment account identifier; and triggering, by a processor of the processing server, in response to a lack of reply from the issuer, a stand-in authorization process including:

transmitting, by the transmitter, a request for limit validation to a node in a first blockchain network associated with the issuer, via a second blockchain network in communication with the payment network, wherein said request includes at least the payment account identifier and the transaction amount, identifying, by the node, a user account profile including the transaction account based on the specific payment account identifier included in the request, determining, by the node, that the transaction amount included in the request exceeds an available credit amount of the transaction account included in the identified user account profile, determining, by the node, that the identified user account profile includes at least one additional transaction account in which an available credit amount thereof in combination with the available credit amount of the transaction account is equal to or greater than the transaction amount, and executing, by the node, a smart contract stored in a blockchain of the first blockchain network, using the request for limit validation as input, wherein execution of the smart contract includes dividing the transaction amount into a first transaction amount for application to the available credit of the transaction account and a second transaction amount for application to the available credit of the additional transaction account and recording payment details on the blockchain.

2. The method of claim 1, further comprising:

storing, in the blockchain of the first blockchain network, a plurality of user account profiles, wherein each user account profile includes information on active transaction accounts associated with the user, said information includes (i) payment account identifiers associated with each respective active transaction account, (ii) account limits of each respective active transaction account, (iii) account balances of each respective active transaction account that are updated in real time, and (iv) an available credit amount of each active account that is updated in real time.

3. The method of claim 1, wherein said payment details include (i) a manner in which the transaction amount was divided and (ii) the transaction accounts to which the first transaction amount and the second transaction amount were applied.

4. The method of claim 1, further comprising:

transmitting, by the node in the first blockchain network, a response message to the processing server in the payment network, via the second blockchain network, wherein said response message includes the payment details and an indication that the transaction should be approved.

5. The method of claim 2, further comprising:

updating, by the node in the first blockchain network, the account balance of the transaction account and the account balance of the at least one additional transaction account, stored in the user account profile, based on the payment details.

6. The method of claim 2, further comprising:

updating, by the node in the first blockchain network, the available credit of the transaction account and the available credit of the at least one additional transaction account, stored in the user account profile, based on the payment details.

7. The method of claim 1, wherein the issuer's network and/or servers are down or offline resulting in the issuer being non-response to the processing server.

8. The method of claim 1, further comprising:

detecting, by the processor of the payment network, that the issuer is responsive; and transmitting, by the transmitter of the processing server, a notification to the issuer, wherein the notification includes the payment details.

9. The method of claim 1, further comprising:

before transmitting the request for limit validation to the node in the first blockchain network associated with the issuer, transmitting, by the transmitter of the processing server, a user authorization request to the merchant terminal, wherein the user authorization request includes a request for user permission to request limit validation; and receiving, by the receiver of the processing server, a response to the user authorization request, wherein the response indicates user approval to request limit validation.

10. A system for stand-in authorization using blockchain, comprising:

a payment network including a processing server;

a merchant terminal;

an issuer of a payment account associated with a payment account identifier;

a first blockchain network associated with the issuer; and a second blockchain network in communication with the first blockchain network and the payment network, wherein a receiver of the processing server within the payment network is configured to receive an authorization message from the merchant terminal for a transaction, said authorization message including at least a specific payment account identifier, a transaction amount, and a merchant identifier;

a transmitter of the processing server is configured to transmit the authorization message to the issuer of the payment account, a processor of the processing server is configured to trigger, in response to a lack of reply from the issuer, a stand-in authorization process, wherein the stand-in authorization process includes:

the transmitter of the processing server transmitting a request for limit validation to a node in the first blockchain network, via the second blockchain network, wherein said request includes at least the payment account identifier and the transaction amount, and the node (i) identifying a user account profile including the transaction account based on the specific payment account identifier included in the request, (ii) determining that the transaction amount included in the request exceeds an available credit amount of the transaction account included in the identified user account profile, (iii) determining that the identified user account profile includes at least one additional transaction account in which an available credit amount thereof in combination with the available credit amount of the transaction account is equal to or greater than the transaction amount, (iv) executing a smart contract stored in a blockchain of the first blockchain network, using the request for limit validation as input, wherein execution of the smart contract includes:

dividing the transaction amount into a first transaction amount for application to the available credit of the transaction account and a second transaction amount for application to the available credit of the additional transaction account, and recording payment details on the blockchain.

11. The system of claim 10, wherein the payment network is configured to store a plurality of user account profiles in a blockchain of the first blockchain network, wherein each user account profile includes information on active transaction accounts associated with the user, said information includes (i) payment account identifiers associated with each respective active transaction account, (ii) account limits of each respective active transaction account, (iii) account balances of each respective active transaction account that are updated in real time, and (iv) an available credit amount of each active account that is updated in real time.

12. The system of claim 11, wherein said payment details include (i) a manner in which the transaction amount was divided and (ii) the transaction accounts to which the first transaction amount and the second transaction amount were applied.

13. The system of claim 10, wherein the node in the first blockchain network is further configured to transmit a response message to the processing server in the payment network, via the second blockchain network, wherein said authorization response message includes the payment details and an indication that the transaction should be approved.

14. The system of claim 11, wherein the node, in the first blockchain network, is further configured to update the account balance of the transaction account and the account balance of the at least one additional transaction account, stored in the user account profile, based on the payment details.

15. The system of claim 11, wherein the node, in the first blockchain network, is further configured to update the available credit of the transaction account and the available credit of the at least one additional transaction account, stored in the user account profile, based on the payment details.

16. The system of claim 10, wherein the issuer's network and/or servers are down or offline resulting in the issuer being non-response to the processing server.

17. The system of claim 10, wherein the processor of the payment network is further configured to detect that the issuer is responsive; and the transmitter of the processing server is further configured to transmit a notification to the issuer, wherein the notification includes the payment details.

18. The system of claim 10, wherein before the transmitter transmits the request for limit validation to the node in the first blockchain network associated with the issuer, the transmitter transmits a user authorization request to the merchant terminal, wherein the user authorization request includes a request for user permission to request limit validation, and the receiver of the processing server receives a response to the user authorization request, wherein the response indicates user approval to request limit validation.

* * * * *